(No Model.)
W. S. HOGG.
SHIP'S LOG.
No. 382,362. Patented May 8, 1888.
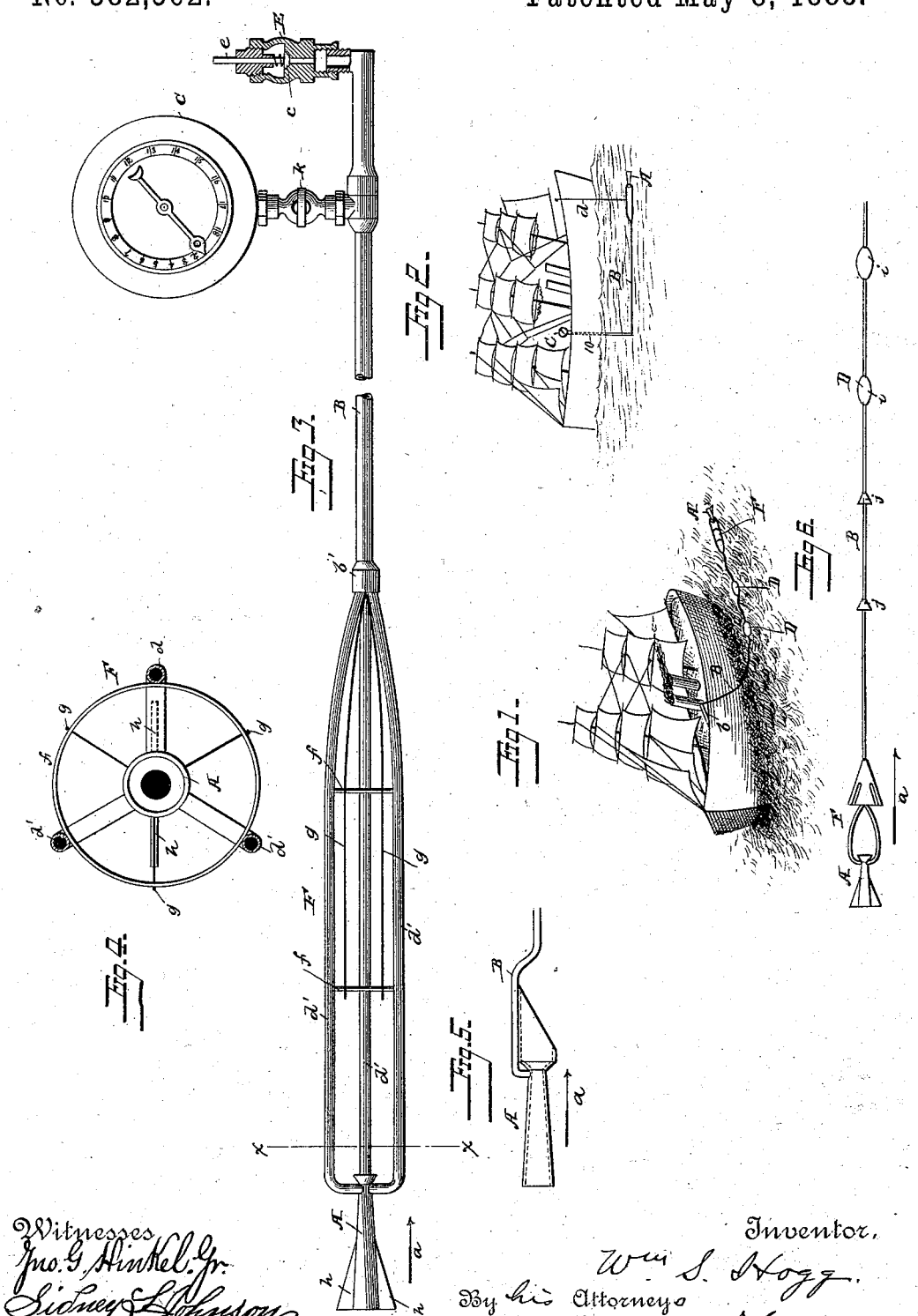

UNITED STATES PATENT OFFICE.

WILLIAM S. HOGG, OF THE UNITED STATES NAVY.

SHIP'S LOG.

SPECIFICATION forming part of Letters Patent No. 382,362, dated May 8, 1888.

Application filed April 18, 1887. Serial No. 235,252. (No model.)

*To all whom it may concern:*

Be it known that I, WILLIAM S. HOGG, of the United States Navy, temporarily residing in Washington, District of Columbia, and a citizen of the United States, have invented certain new and useful Improvements in Ships' Logs, fully set forth in the following specification and represented in the accompanying drawings.

This invention relates to ships' logs—that is to say, to that class of devices that are employed to determine the speed of a vessel moving through the water.

In Letters Patent granted to me February 7, 1882, No. 253,287, there is set forth a device for determining the speed of a vessel by creating a vacuum in a tube extending into the water a distance from the vessel, and so as to be outside of the body of water affected by the vessel's motion, which tube communicated with an indicating device upon the vessel so graduated as to show the extent of vacuum produced by the withdrawal of air or water in the vacuum-tube by the water in passing the contracted part of an open tube as it is towed and carried through the water by the vessel.

The present invention consists in certain improvements upon the device set forth in said patent, whereby, among other things, to prevent damage to the indicating-instrument and to obviate the liability of the vacuum-tube becoming fouled or otherwise clogged by substances floating in the water.

In the drawings, Figure 1 is a view of a vessel, illustrating one mode of using the improved speed-indicating instrument. Fig. 2 is a like view illustrating another method of using the same. Fig. 3 is an enlarged elevation of the speed-indicating instrument, portions of the same being shown in section. Fig. 4 is a cross-section through the vacuum-instrument and its guard, taken on the line $xx$ of Fig. 3. Fig. 5 is an elevation of the vacuum-instrument, showing a modified form of the guard; and Fig. 6 is an elevation of the vacuum-instrument, its flexible tube, guard, and floats.

As in my said patent the instrument consists, essentially, of a flexible pipe or tube, B, connected at one end with an indicator or gage, C, upon the vessel, its other end being connected to a vacuum device, A. This device or instrument consists of a tube contracted in diameter at one point and open at both ends, and having a flaring mouth to better catch the water, and tending to keep the instrument immersed as the tube is drawn through the water in the direction of the arrow $a$, Figs. 3 and 5.

The vacuum-instrument may be towed from the vessel in any suitable way, so long as it is far enough removed from the vessel that it will not be subjected to its pitching and rolling motion or to the "dead-water" produced by its frictional contact with the ship's sides—as, for instance, in the manner shown in Fig. 1, wherein the flexible pipe B is led from a spar, $b$, projecting some distance from the side of the vessel, said flexible tube connecting with the indicator on the vessel; or it may be towed in the manner shown in Fig. 2, where a metallic tube, 10, is led from the indicator on the vessel through the vessel's bottom or side extending into the water at some distance therefrom, and connected by the flexible pipe B to the vacuum-instrument A, in such manner that the latter will be removed from the vessel's dead-water, the metallic tube 10 being projected into the water a sufficient distance from the vessel's side to effect this result. In this latter illustration the one or more floats D employed to float the vacuum-instrument shown in Fig. 1 will be omitted, and a line, $d$, employed to draw the instrument upon the deck of the vessel when not in use, or for the purpose of clearing the instrument should it get fouled by substances held in suspension by the water. The flexible pipe connecting the tube 10 with the vacuum-instrument will be of such length as to permit the instrument being drawn upon the vessel's deck.

In order to prevent damage to the indicating-instrument C by any undue back-pressure of air in the flexible tube should the vacuum-instrument and tube sink for any cause, as from accident to the floats or the stopping of the vessel in case the floats are not used as in the manner shown in Fig. 2, I provide at any point in said flexible tube, or at the indicator, an automatic relief-valve, E. This valve may be of any construction which will automatically operate to relieve the pressure in the flexible tube and allow the air to escape without exerting any hurtful influence upon the gage.

As herein shown, Fig. 3, the said relief-valve is connected to a prolongation of the flexible tube B beyond the gage, and is provided with a valve, c, held to its seat by a slight spring, said valve being provided with a projecting stem, e, by which it may be raised by hand should it be desired to clear the flexible tube of water by admitting air thereto. The indicating-instrument will also be provided with a valve, k, by means of which the vibrations of the indicating-hand may be stopped by contracting or throttling its communication with the tube B.

It is desirable to provide the vacuum-instrument with means whereby the fouling of the same by substances held in suspension by the water may be obviated and its mouth prevented from becoming clogged or choked. To this end I provide the instrument with a guard, F, that is so arranged with relation to its mouth that while it serves as an effectual means of preventing it from becoming clogged or choked the passage of the water therethrough is not interrupted. This guard F, it is obvious, may be of many forms, as shown in Fig. 3. It consists of a series of tubes or rods, d', preferably tubes for sake of lightness and rigidity, extending from the vacuum-instrument A a suitable distance in front thereof to a point on the flexible tube B, to which they are connected in any suitable manner. These tubes d', one or all of which may form a continuation of said flexible tube with the vacuum-instrument, (and connected with the latter, so that the vacuum therein will be produced in the same manner as in the device set forth in my said patent,) are curved or spread apart (see Fig. 4) a suitable distance from the mouth of said instrument, so that the passage of water thereto is not interrupted, and are brought together at some distance therefrom in a coupling-piece, b', the guard F thus forming a conical front extension to the instrument, as is clearly shown. These tubes may be stayed by rings f, arranged at distances apart, as shown, or otherwise suitably supported, and provided, if desired, with fine wires g, serving as additional guards for the vacuum-instrument. Other means may be provided for preventing the fouling of the instrument, such as an envelope of wire-cloth or similar material, as is obvious. The same purpose may be attained by providing the vacuum-instrument with the guard F, Fig. 5, projecting therefrom and having an open mouth, but cut on a bevel or incline, so that substances caught thereby will be deflected or readily freed therefrom. The guard F need not form a part of the vacuum-instrument. As shown in Fig. 6, it is supported on the flexible tube B a short distance in front of the mouth of said instrument. In this instance the guard may be a solid cone simply perforated to allow the passage of the tube B, and slotted to permit the passage of water through it.

In order to cause the vacuum-instrument to tow straight and come to the surface of the water at low speeds—when, for instance, the speed of the vessel is suddenly checked for any purpose—I provide the flexible tube or instrument with vanes, wings, or other like devices, h. As shown in Fig. 4, the vanes h are provided upon the sides of the vacuum-instrument. They obviously may be carried by the guards before described, or by one or all of the floats with which the flexible tube may be provided.

Instead of employing only a single large float, as in the device set forth in my said patent, I prefer to use a number of small floats, D, as shown in Fig. 6, arranged on the flexible tube at different distances apart, so that at low speeds all the floats will assist in floating the tube, while at high speeds, and hence with increased resistance between the tube and the water, each in turn will be raised from the water, so that at times none will be needed or only one float will be sufficient to float the instrument and said resistance considerably reduced. These floats may be of the usual form, as shown at i; or they may consist of conical floats or resistance-pieces j, and in either form may be adjusted on said tube.

I claim—

1. In a ship's log, the combination of a vacuum-tube, indicator, and relief-valve for clearing the tube of water, substantially as described.

2. In a ship's log, the combination of a vacuum-instrument, a tube, an indicator, and a relief-valve for clearing the tube of water, substantially as described.

3. In a ship's log, the combination of a vacuum-instrument, a tube, an indicator, throttling device, and a relief-valve for clearing the tube of water, substantially as described.

4. In a ship's log, the combination of a vacuum-tube, indicator, and a relief-valve provided with a stem to be operated by hand for clearing the tube of water, substantially as described.

5. In a ship's log, the combination of a vacuum-instrument consisting of an open-ended tube and a guard supported in front thereof, substantially as described.

6. In a ship's log, the combination of a vacuum-instrument consisting of an open-ended tube, its tube, and a guard supported in front of said instrument and connected with said tube, substantially as described.

7. In a ship's log, the combination of a vacuum-instrument consisting of an open-ended tube, its tube, and a guard supported in front of said instrument and connected both to the instrument and to the tube, substantially as described.

8. In a ship's log, the combination of a vacuum-instrument and a guard composed of a series of rigid pieces, one of which is a tube communicating with the instrument, substantially as described.

9. In a ship's log, the combination of a vacuum-instrument, its tube, and a guard composed of a series of rigid pieces, one of which is a tube communicating with the instrument, and all connected together at one end with said tube, substantially as described.

10. A vacuum-instrument for a ship's log, consisting of an open-ended tube provided with a conical guard projecting in front of its mouth, substantially as described.

11. A vacuum-instrument for a ship's log, consisting of an open-ended tube provided with a conical guard projecting in front of its mouth and open so as not to interrupt the passage of water thereto, substantially as described.

12. A vacuum-instrument for a ship's log, consisting of an open-ended tube provided with a guard projecting in front thereof and having guard-wires $g$, substantially as described.

13. In a ship's log, the combination of a vacuum-instrument provided with a guard in front of its mouth, its tube, and vanes for keeping the instrument in a horizontal position and bringing it to the surface at low speeds, substantially as described.

14. In a ship's log, the combination of a vacuum-instrument consisting of an open-ended tube provided with a guard, its tube, and vanes for keeping the instrument in a horizontal position, substantially as described.

In testimony whereof I have signed my name to this specification in the presence of two subscribing witnesses.

W. S. HOGG.

Witnesses:
F. L. FREEMAN,
GEO. H. GRAHAM.